(12) United States Patent
Chai et al.

(10) Patent No.: US 10,095,576 B2
(45) Date of Patent: Oct. 9, 2018

(54) ANOMALY RECOVERY METHOD FOR VIRTUAL MACHINE IN DISTRIBUTED ENVIRONMENT

(71) Applicant: CHINA UNIONPAY CO., LTD., Shanghai (CN)

(72) Inventors: Hongfeng Chai, Shanghai (CN); Zhijun Lu, Shanghai (CN); Lijun Zu, Shanghai (CN); Yixing Yan, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 59 days.

(21) Appl. No.: 15/308,497

(22) PCT Filed: May 5, 2015

(86) PCT No.: PCT/CN2015/078248
§ 371 (c)(1),
(2) Date: Nov. 2, 2016

(87) PCT Pub. No.: WO2015/169199
PCT Pub. Date: Nov. 12, 2015

(65) Prior Publication Data
US 2017/0060671 A1      Mar. 2, 2017

(30) Foreign Application Priority Data

May 8, 2014   (CN) .......................... 2014 1 0191655

(51) Int. Cl.
*G06F 11/00* (2006.01)
*G06F 11/07* (2006.01)
*G06F 11/14* (2006.01)

(52) U.S. Cl.
CPC .......... *G06F 11/0793* (2013.01); *G06F 11/07* (2013.01); *G06F 11/0709* (2013.01);
(Continued)

(58) Field of Classification Search
CPC ............. G06F 11/1402; G06F 11/1446; G06F 11/1448; G06F 11/1458
(Continued)

(56) References Cited

U.S. PATENT DOCUMENTS 7,197,561 B1 *   3/2007   Lovy ................... H04L 41/0233
                                                      709/217
7,925,923 B1 *   4/2011   Hyser ................... G06F 11/203
                                                      714/11
(Continued)

FOREIGN PATENT DOCUMENTS

CN         1027080818 A       10/2012
CN         102819465 A        12/2012
(Continued)

*Primary Examiner* — Sarai E Butler
(74) *Attorney, Agent, or Firm* — The Ollila Law Group LLC

(57) ABSTRACT

The invention proposes a virtual machine abnormity recovering method in distributed environment, comprising: running an independent computing assembly on each physical machine on which a virtual machine resides, wherein the computing assembly periodically reports the current running state of the corresponding physical machine to a state database; periodically polling the state database by a highly available controller so as to check the running state of all the physical machines in a physical machine group under the control of the highly available controller; and executing subsequent abnormity processing operation if the running state of only one physical machine in the physical machine group is abnormal so as to ensure that virtual machines on the physical machine whose running state is abnormal continues running normally. The virtual machine abnormity recovering method in distributed environment disclosed by the invention can accurately determine and efficiently handle faults of the physical machines in a distributed environment.

7 Claims, 1 Drawing Sheet

(52) U.S. Cl.
CPC ........ *G06F 11/079* (2013.01); *G06F 11/0712* (2013.01); *G06F 11/0751* (2013.01); *G06F 11/0787* (2013.01); *G06F 11/1484* (2013.01)

(58) Field of Classification Search
USPC .......................................................... 714/15
See application file for complete search history.

(56) References Cited

U.S. PATENT DOCUMENTS

| | | |
|---|---|---|
| 2011/0035620 A1 | 2/2011 | Elyashev et al. |
| 2015/0012776 A1* | 1/2015 | Banikazemi ........ G06F 11/1658 714/6.31 |
| 2016/0062853 A1* | 3/2016 | Sugabrahmam .... G06F 11/1471 714/4.11 |
| 2016/0328010 A1* | 11/2016 | Cochran ................... G06F 1/30 |
| 2017/0168907 A1* | 6/2017 | Harper ................ G06F 11/2033 |
| 2017/0242764 A1* | 8/2017 | Antony ............... G06F 11/2007 |

FOREIGN PATENT DOCUMENTS

| | | |
|---|---|---|
| CN | 103729280 A | 4/2014 |
| JP | 2013254354 A | 12/2013 |

* cited by examiner

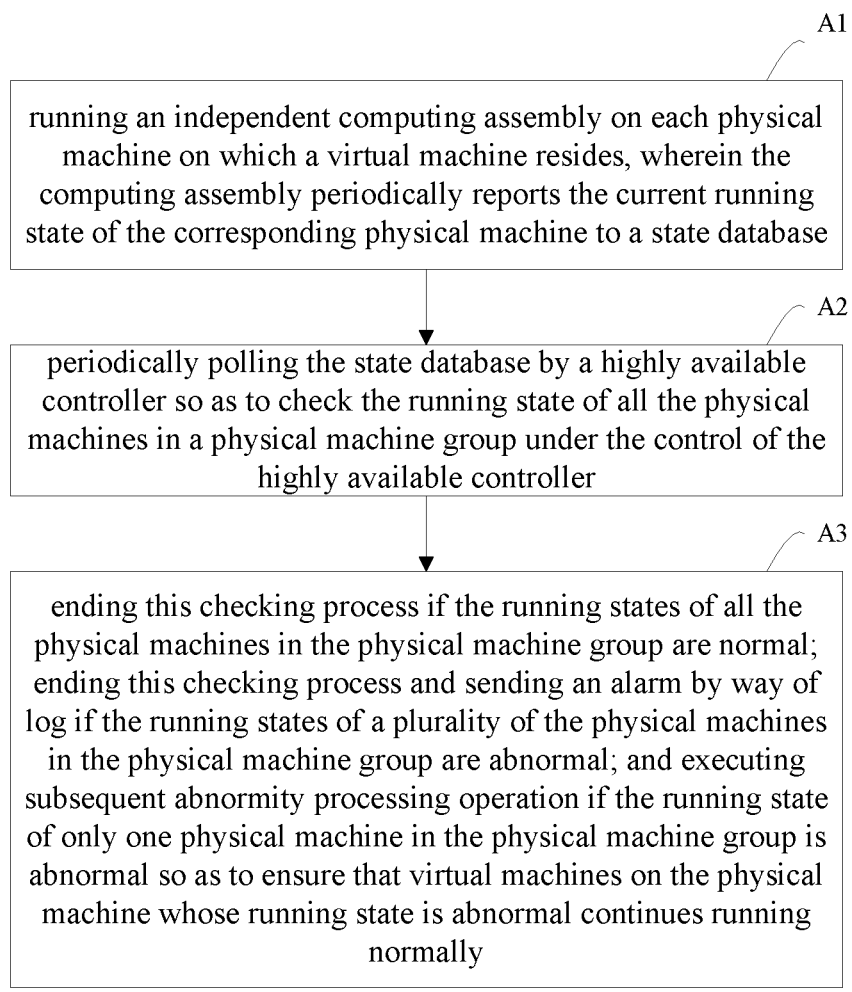

ANOMALY RECOVERY METHOD FOR VIRTUAL MACHINE IN DISTRIBUTED ENVIRONMENT

FIELD OF THE INVENTION

The invention relates to a virtual machine abnormity recovering method, and in particular, to a virtual machine abnormity recovering method in distributed environment.

BACKGROUND

Currently, as computer and network applications become increasingly widespread and business types in different fields become increasingly abundant, a highly available technology (i.e., a technology in which when a physical machine A has such problems as breakdown, a virtual machine running on the physical machine A can start up on a physical machine B without human intervention so that a continuous running of the virtual machine is ensured) of a virtual machine in distributed environment (virtual machine refers to a computer system which runs on a physical machine in a way of software simulation, has a complete hardware system function, and operates in a completely isolated environment) is becoming more and more important.

In existing technical solutions, typically, a high availability of virtual machine in a distributed environment is realized in the following manner: a logic group composed of a plurality of physical machines is defined as a highly available unit; in this way, when any physical machine in this logic group has a breakdown or other problems, all of the virtual machines running on this physical machine will start up on other physical machines in the same logic group. Moreover, a control node detects the states of physical machines in a way of heartbeating or regularly pinging physical machines, that is, when the control node cannot detect a certain physical machine, it is considered that this physical machine has a problem.

However, the existing technical solutions have the following problems: (1) after a virtual machine is allocated to a highly available group, whether the business running on this virtual machine is important or not, the virtual machine is acquiescently considered to have a high availability. Therefore, such design cannot ensure that a virtual machine which runs important businesses is activated preferentially, and some wastes and redundancies are also caused to resources; (2) since only the state of physical machine is detected, this detection method is simplex and one-sided, thus possibly causing erroneous determination (e.g., if the ping function is prohibited on a certain physical machine, it is possible to transfer the virtual machines on the physical machines that are running normally to another physical machine); (3) since the detection of the state of physical machine is initiated merely from the control node, the determination of the state of physical machine is not complete and accurate enough.

Therefore, there is a need to provide a virtual machine abnormity recovering method which can accurately determine and efficiently handle the faults of physical machines in a distributed environment.

SUMMARY OF THE INVENTION

In order to address the problems in the prior art solutions, the invention proposes a virtual machine abnormity recovering method which can accurately determine and efficiently handle the faults of physical machines in a distributed environment.

The objects of the invention is achieved by the following technical solution.

A virtual machine abnormity recovering method in distributed environment, comprising the following steps:

(A1) running an independent computing assembly on each physical machine on which a virtual machine resides, wherein the computing assembly periodically reports the current running state of the corresponding physical machine to a state database;

(A2) periodically polling the state database by a highly available controller so as to check the running state of all the physical machines in a physical machine group under the control of the highly available controller; and (A3) ending this checking process if the running states of all the physical machines in the physical machine group are normal; ending this checking process and sending an alarm by way of log if the running states of a plurality of the physical machines in the physical machine group are abnormal; and executing the subsequent abnormity processing operation if the running state of only one physical machine in the physical machine group is abnormal so as to ensure that the virtual machines on the physical machine whose running state is abnormal continues running normally.

In the above disclosed technical solutions, preferably, the abnormity processing operation comprises: the highly available controller detects the connectivity of the physical machine whose running state is abnormal to a management network, wherein the detection is performed in the following two ways: (1) pinging the physical machine; and (2) monitoring number 22 port of the physical machine.

In the above disclosed technical solutions, preferably, the abnormity processing operation further comprises: ending the abnormity processing operation if it is detected in any of the above ways that the physical machine whose running state is abnormal has connectivity to the management network; detecting the connectivity of all the active virtual machines running on the physical machine whose running state is abnormal to business network if it is detected in the above two ways that the physical machine whose running state is abnormal has no connectivity to the management network; ending the abnormity processing operation if any of the active virtual machines has a connectivity to the business network, and executing a secondary voting operation if none of the active virtual machines has connectivity to the business network so as to eventually confirm whether the physical machine whose running state is abnormal has a fault.

In the above disclosed technical solutions, preferably, the secondary voting operation comprises: (1) the highly available controller randomly selects several physical machines from the physical machine group other than the physical machine whose running state is abnormal; (2) the highly available controller instructs each selected physical machine to detect the connectivity of the physical machine whose running state is abnormal to the management network and/or the business network by pinging the physical machine whose running state is abnormal and monitoring number 22 port of the physical machine whose running state is abnormal; (3) if any of the selected physical machines finds that the physical machine whose running state is abnormal has connectivity to the management network or the business network, the secondary voting operation is ended, and the result of the secondary voting operation is "the physical machine whose running state is abnormal has no fault", whereas if all the selected physical machines find that the physical machine whose running state is abnormal has no connectivity to either the management network or the business network, the secondary voting operation is ended, and the result of the secondary voting operation is "the physical machine whose running state is abnormal has a fault", and subsequently, a virtual machine relocating operation is executed.

In the above disclosed technical solutions, preferably, the virtual machine relocating operation comprises: (1) the highly available controller sends a shutdown instruction to the physical machine whose running state is abnormal via an intelligent platform management interface (IPMI) so as to make the physical machine whose running state is abnormal to be in a shutdown state, and thus destroying the virtual machine which resides in the memory thereof; (2) the highly available controller sends a relocation scheduling instruction to a scheduling controller; (3) after receiving the relocation scheduling instruction, the scheduling controller selects the physical machines in the physical machine group which have idle resources, and then sends a relocating instruction to the selected physical machines which have idle resources one by one so that all the active virtual machines running on the physical machine whose running state is abnormal to the selected physical machines which have idle resources, wherein the virtual machines to be relocated and allocated to different physical machines which have idle resources are different from each other; (4) the computing assembly running on each of all the physical machines which have idle resources relocates the virtual machine to be relocated and allocated to this physical machine to this physical machine, via a shared storing device.

In the above disclosed technical solutions, preferably, user can configure a high availability flag for individual virtual machines, and the highly available controller determines the high availability flags of all the active virtual machines running on the physical machine whose running state is abnormal before the virtual machine relocating operation is executed, and executes the subsequent virtual machine relocating operation only to a virtual machine whose value of high availability flag is "activated".

In the above disclosed technical solutions, preferably, user can configure a high availability priority for individual virtual machines, and the highly available controller relocates individual virtual machines to be relocated one by one according to the height level of the high availability priority of each virtual machine to be relocated.

The virtual machine abnormity recovering method in distributed environment disclosed by the invention has the following advantages: (1) it can be ensured that the virtual machine on which important businesses are running is activated and recovered preferentially, and thus saving resources; (2) due to the diversity and comprehensiveness of network detecting, the possibility of erroneous determination is significantly reduced; (3) since the detection of the state of physical machine can not only be initiated by the control node, but also can be initiated by other physical machines randomly selected, the state of physical machine can be determined more fully and accurately.

BRIEF DESCRIPTION OF THE DRAWINGS

The technical features and advantages of the invention will be better understood by those skilled in the art with reference to the accompanying drawings, in which:

FIG. 1 is a flowchart of the virtual machine abnormity recovering method in distributed environment according to the embodiment of the invention.

DETAILED DESCRIPTION OF THE INVENTION

FIG. 1 is a flowchart of the virtual machine abnormity recovering method in distributed environment according to the embodiment of the invention. As shown in FIG. 1, the virtual machine abnormity recovering method in distributed environment disclosed by the invention comprises the following steps: (A1) running an independent computing assembly on each physical machine on which a virtual machine resides, wherein the computing assembly periodically (e.g., every other minute) reports the current running state of the corresponding physical machine to a state database; (A2) periodically (e.g., every other 2 seconds) polling the state database by a highly available controller so as to check the running state of all the physical machines in a physical machine group under the control of the highly available controller; (A3) ending this checking process if the running states of all the physical machines in the physical machine group are normal; ending this checking process and sending an alarm by way of log if the running states of a plurality of the physical machines in the physical machine group are abnormal; and executing subsequent abnormity processing operation if the running state of only one physical machine in the physical machine group is abnormal (e.g., a certain physical machine does not report the running state of its own within 1 minute) so as to ensure the virtual machines on the physical machine whose running state is abnormal continues running normally.

Preferably, in the virtual machine abnormity recovering method in distributed environment disclosed by the invention, the abnormity processing operation comprises: the highly available controller detects the connectivity of the physical machine whose running state is abnormal to a management network, wherein the detection is performed in the following two ways: (1) pinging the physical machine; and (2) monitoring number 22 port of the physical machine.

Preferably, in the virtual machine abnormity recovering method in distributed environment disclosed by the invention, the abnormity processing operation further comprises: ending the abnormity processing operation if it is detected in any of the above ways that the physical machine whose running state is abnormal has connectivity to the management network; detecting the connectivity of all the active virtual machines running on the physical machine whose running state is abnormal to business network if it is detected in the above two ways that the physical machine whose running state is abnormal has no connectivity to the management network; ending the abnormity processing operation if any of the active virtual machines has the connectivity to the business network, and executing a secondary voting operation if none of the active virtual machines has connectivity to the business network so as to eventually confirm whether the physical machine whose running state is abnormal has a fault.

Preferably, in the virtual machine abnormity recovering method in distributed environment disclosed by the invention, the secondary voting operation comprises: (1) the highly available controller randomly selects several physical machines (e.g., three physical machines) from the physical machine group other than the physical machine whose running state is abnormal; (2) the highly available controller instructs each selected physical machine to detect the connectivity of the physical machine whose running state is abnormal to the management network and/or the business network by pinging the physical machine whose running state is abnormal and monitoring number 22 port of the physical machine whose running state is abnormal; (3) if any of the selected physical machines finds that the physical machine whose running state is abnormal has connectivity to the management network or the business network, the secondary voting operation is ended, and the result of the secondary voting operation is "the physical machine whose running state is abnormal has no fault", whereas if all the selected physical machines find that the physical machine whose running state is abnormal has no connectivity to either the management network or the business network, the secondary voting operation is ended, and the result of the secondary voting operation is "the physical machine whose running state is abnormal has a fault", and subsequently, a virtual machine relocating operation is executed.

Preferably, in the virtual machine abnormity recovering method in distributed environment disclosed by the invention, the virtual machine relocating operation comprises: (1) the highly available controller sends a shutdown instruction to the physical machine whose running state is abnormal via an intelligent platform management interface (IPMI) so as to make the physical machine whose running state is abnormal to be in a shutdown state (i.e., it no longer provides any service to the outside), and thus destroying the virtual machine which resides in the memory thereof (by way of example, if the intelligent platform management interface (IPMI) is abnormal, the virtual machine relocating operation is not stopped, but an alarm will be sent in the form of log); (2) the highly available controller sends a relocation scheduling instruction to a scheduling controller; (3) after receiving the relocation scheduling instruction, the scheduling controller selects physical machines in the physical machine group which have idle resources, and then sends a relocating instruction to the selected physical machines which have idle resources one by one so that all the active virtual machines running on the physical machine whose running state is abnormal to the selected physical machines which have idle resources, wherein the virtual machines to be relocated and allocated to different physical machines which have idle resources are different from each other; (4) the computing assembly running on each of all the physical machines which have idle resources relocates the virtual machine to be relocated and allocated to this physical machine to this physical machine, via a shared storing device. By way of example, in order to ensure that at the same time point, for each independent virtual machine mirror image file, only one virtual machine instance is running in the entire distributed system, the highly available controller can modify the mirror image file saving directory of the virtual machine so as to prevent the physical machine whose running state is abnormal from activating the virtual machine instance during the procedure of the relocating operation.

Preferably, in the virtual machine abnormity recovering method in distributed environment disclosed by the invention, user can configure a high availability flag for individual virtual machines, and the highly available controller determines the high availability flag of all the active virtual machines running on the physical machine whose running state is abnormal before the virtual machine relocating operation is executed, and executes the subsequent virtual machine relocating operation only to a virtual machine whose value of high availability flag is "activated".

Preferably, in the virtual machine abnormity recovering method in distributed environment disclosed by the invention, user can configure a high availability priority for individual virtual machines, and the highly available controller relocates individual virtual machines to be relocated one by one according to the height level of the high availability priority of each virtual machine to be relocated. By way of example, if the high availability priority of a virtual machine is configured to be "high", then it indicate: for this virtual machine, it is ensured that enough idle resources are preserved so as to ensure this virtual machine can be relocated, and if the high availability priority of a virtual machine is configured to be "medium" or "low", then it indicate: for this virtual machine, a corresponding priority sequence is instructed to be ensured during relocating, but it cannot be ensured that there are enough idle resources to preserve.

It can be seen from the above that the virtual machine abnormity recovering method in distributed environment disclosed by the invention has the following advantages: (1) it can be ensured that the virtual machine on which important businesses are running is activated and recovered preferentially, thus saving resources; (2) due to the diversity and comprehensiveness of network detecting, a possibility of erroneous determination is significantly reduced; (3) since the detection of the state of physical machine can not only be initiated by the control node, but also can be initiated by other physical machines randomly selected, the state of physical machine can be determined more fully and accurately.

While the invention has been described through the above described preferred embodiments, the ways of carrying out the invention are not limited to the above embodiments. It should be realized that different variations and modifications to the invention can be made by those skilled in the art without departing from the spirit and scope of the invention.

The invention claimed is:

1. A virtual machine abnormity recovering method in distributed environment, comprising the following steps:
   (A1) running an independent computing assembly on each physical machine on which a virtual machine resides, wherein the computing assembly periodically reports the current running state of the corresponding physical machine to a state database;
   (A2) periodically polling the state database by a highly available controller so as to check the running state of all the physical machines in a physical machine group under the control of the highly available controller; and
   (A3) ending this checking process if the running states of all the physical machines in the physical machine group are normal; ending this checking process and sending an alarm by way of log if the running states of a plurality of the physical machines in the physical machine group are abnormal; and executing subsequent abnormity processing operation if the running state of only one physical machine in the physical machine group is abnormal so as to ensure that virtual machines on the physical machine whose running state is abnormal continues running normally.

2. A virtual machine abnormity recovering method in distributed environment according to claim 1, wherein the abnormity processing operation comprises: the highly available controller detects the connectivity of the physical machine whose running state is abnormal to a management network, wherein the detection is performed in the following two ways: (1) pinging the physical machine; and (2) monitoring number 22 port of the physical machine.

3. A virtual machine abnormity recovering method in distributed environment according to claim 2, wherein the abnormity processing operation further comprises: ending the abnormity processing operation if it is detected in any of the above ways that the physical machine whose running state is abnormal has connectivity to the management network; detecting the connectivity of all the active virtual machines running on the physical machine whose running state is abnormal to business network if it is detected in the above two ways that the physical machine whose running state is abnormal has no connectivity to the management network; ending the abnormity processing operation if any of the active virtual machines has the connectivity to the business network, and executing a secondary voting operation if none of the active virtual machines has connectivity to the business network so as to eventually confirm whether the physical machine whose running state is abnormal has a fault.

4. A virtual machine abnormity recovering method in distributed environment according to claim 3, wherein the secondary voting operation comprises: (1) the highly available controller randomly selects several physical machines from the physical machine group other than the physical machine whose running state is abnormal; (2) the highly available controller instructs each selected physical machine to detect the connectivity of the physical machine whose running state is abnormal to the management network and/or the business network by pinging the physical machine whose running state is abnormal and monitoring number 22 port of the physical machine whose running state is abnormal respectively; (3) if any of the selected physical machines finds that the physical machine whose running state is abnormal has connectivity to the management network or the business network, the secondary voting operation is ended, and the result of the secondary voting operation is "the physical machine whose running state is abnormal has no fault", whereas if all the selected physical machines find that the physical machine whose running state is abnormal has no connectivity to either the management network or the business network, the secondary voting operation is ended, and the result of the secondary voting operation is "the physical machine whose running state is abnormal has a fault", and subsequently, a virtual machine relocating operation is executed.

5. A virtual machine abnormity recovering method in distributed environment according to claim 4, wherein the virtual machine relocating operation comprises: (1) the highly available controller sends a shutdown instruction to the physical machine whose running state is abnormal via an intelligent platform management interface (IPMI) so as to make the physical machine whose running state is abnormal to be in a shutdown state, and thus destroying the virtual machine which resides in the memory thereof; (2) the highly available controller sends a relocation scheduling instruction to a scheduling controller; (3) after receiving the relocation scheduling instruction, the scheduling controller selects physical machines in the physical machine group which have idle resources, and then sends a relocating instruction to the selected physical machines which have idle resources one by one so that all the active virtual machines running on the physical machine whose running state is abnormal to the selected physical machines which have idle resources, wherein the virtual machines to be relocated and allocated to different physical machines which have idle resources are different from each other; (4) the computing assembly running on each of all the physical machines which have idle resources relocates the virtual machine to be relocated and allocated to this physical machine to this physical machine, via a shared storing device.

6. A virtual machine abnormity recovering method in distributed environment according to claim 5, wherein user can configure a high availability flag for individual virtual machines, and the highly available controller determines the high availability flags of all the active virtual machines running on the physical machine whose running state is abnormal before the virtual machine relocating operation is executed, and executes the subsequent virtual machine relocating operation only to the virtual machines whose value of high availability flag is "activated".

7. A virtual machine abnormity recovering method in distributed environment according to claim 6, wherein user can configure a high availability priority for individual virtual machines, and the highly available controller relocates individual virtual machines to be relocated one by one according to the height level of the high availability priority of each virtual machine to be relocated.

* * * * *